United States Patent
Woolsey

(10) Patent No.: US 9,684,557 B2
(45) Date of Patent: Jun. 20, 2017

(54) SYSTEM AND METHOD FOR FACILITATING RECOVERY FROM A DOCUMENT CREATION ERROR

(75) Inventor: Les G. Woolsey, Ottawa (CA)

(73) Assignee: Adobe Systems Incorporated, San Jose, CA (US)

( * ) Notice: Subject to any disclaimer, the term of this patent is extended or adjusted under 35 U.S.C. 154(b) by 2178 days.

(21) Appl. No.: 11/398,575

(22) Filed: Apr. 4, 2006

(65) Prior Publication Data

US 2014/0013155 A1    Jan. 9, 2014

(51) Int. Cl.
G06F 11/07   (2006.01)
G06F 3/12    (2006.01)

(52) U.S. Cl.
CPC .......... *G06F 11/0793* (2013.01); *G06F 3/121* (2013.01); *G06F 11/0706* (2013.01)

(58) Field of Classification Search
CPC ................................ G06F 3/121; G06F 11/00
USPC .................................................. 715/523, 249
See application file for complete search history.

(56) References Cited

U.S. PATENT DOCUMENTS

| | | | |
|---|---|---|---|
| 5,859,920 A | 1/1999 | Daly et al. | |
| 6,192,381 B1* | 2/2001 | Stiegemeier et al. | ........ 715/210 |
| 6,202,199 B1 | 3/2001 | Wygodny et al. | |
| 6,282,701 B1 | 8/2001 | Wygodny et al. | |
| 6,470,388 B1* | 10/2002 | Niemi et al. | .................. 709/224 |
| 6,778,703 B1* | 8/2004 | Zlotnick | ........................ 382/218 |
| 2004/0205546 A1* | 10/2004 | Blumberg | ....................... 715/512 |
| 2005/0076215 A1* | 4/2005 | Dryer | ............................. 713/170 |
| 2005/0137916 A1* | 6/2005 | McElhannon | .................... 705/5 |
| 2005/0248668 A1 | 11/2005 | Machida | |
| 2006/0089931 A1* | 4/2006 | Giacobbe et al. | ................ 707/9 |

* cited by examiner

*Primary Examiner* — Kavita Padmanabhan
*Assistant Examiner* — Tionna Burke
(74) *Attorney, Agent, or Firm* — Kilpatrick Townsend & Stockton LLP

(57) ABSTRACT

A system and method for facilitating recovery from an error occurring during creation or alteration of a target document from a form or template. The method may involve gathering some or all input collateral (e.g., the document template, input data, instructions for creating the document) and adding it to the target document. If the target document is not created, the input collateral may be placed in an error document. The target or error document is dispatched to the user and may also be sent to support personnel (e.g., help desk, technical support personnel) or forward to such personnel by the user. Capturing the document creation conditions and parameters in the target or error document allows the support personnel (or user) to diagnose and/or recover from the error without expending the time and effort that would be required to gather the separate input collateral items, log files, configuration parameters, etc.

11 Claims, 2 Drawing Sheets

SYSTEM AND METHOD FOR FACILITATING RECOVERY FROM A DOCUMENT CREATION ERROR

BACKGROUND

This invention relates to the field of computer systems. More particularly, a system and methods are provided for facilitating recovery from a failed attempt to create a document.

Forms and templates are often used to generate documents. For example, a company's personnel department may offer a variety of electronic forms for employees to use for various purposes (e.g., updating benefits information, tax withholding). Different employees can use the forms or templates to create documents tailored to their needs.

However, many different errors may occur when a form or template is used to generate a document. For example, data needed to complete a form may not be available or may be of an invalid type or format, the logic for merging the form and input data may be flawed, etc. If an error is serious enough, the document may not even be generated.

When creation of a document fails, or the created document contains an error, it is often very difficult to correct the error or errors. Typically, the document is being created for an end user, and is transmitted or served to that user. However, the user may not be savvy regarding the document creation process and may not understand why the error occurred. Therefore, the user may contact a help desk or a technical support office to have the problem fixed.

However, the help desk or technical support personnel may not be able to trace or reproduce the error even if they attempt to create the same document using the same form, because they may be doing so with different parameters (e.g., different access rights, different default directories, different software version). For example, they may not be able to access data used to create the document, either for security reasons or because the data changes in real time. The personnel may therefore have to access log files created during the document creation process, review configuration files used by in the creation process, examine the input data, and so on.

Fixing a document creation failure or error can therefore be a time-consuming evolution, and may not even be possible if the failure or error cannot be traced.

SUMMARY

In one embodiment of the invention, a system and methods are provided for facilitating recovery from an error occurring during creation of a target document from a form or template. The method may involve gathering some or all input collateral (e.g., the document template, input data, instructions for creating the document) and adding it to the target document. If the target document is not created, the input collateral may be placed in an error document.

In an embodiment of the invention, the target or error document is dispatched to the user and may also be sent to support personnel (e.g., help desk, technical support personnel) or forwarded to such personnel by the user. By capturing the document creation conditions and parameters in the target or error document, the support personnel (or user) can diagnose and/or recover from the error without expending the time and effort that would normally be required to gather the template, input data, log files, configuration parameters, etc.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a system and method are provided for facilitating recovery from a document creation error. The error may involve a failure to create the document (e.g., a severe error), or an error that is not apparent until a user examines or reviews the document (e.g., a non-severe error).

A method of facilitating recovery may include gathering some or all input collateral used in the document creation effort (e.g., input data, document form or template, sequencing instructions) at the time the error occurs, and forwarding the collected information to the user who initiated the document creation or who was to receive the document and/or support personnel.

The information may be merged with the document or used to create one if the user's desired document could not be created. The information may be used by the user and/or support personnel (e.g., technical support personnel, help desk, developer) to trace or recover from the error.

Figure 1:
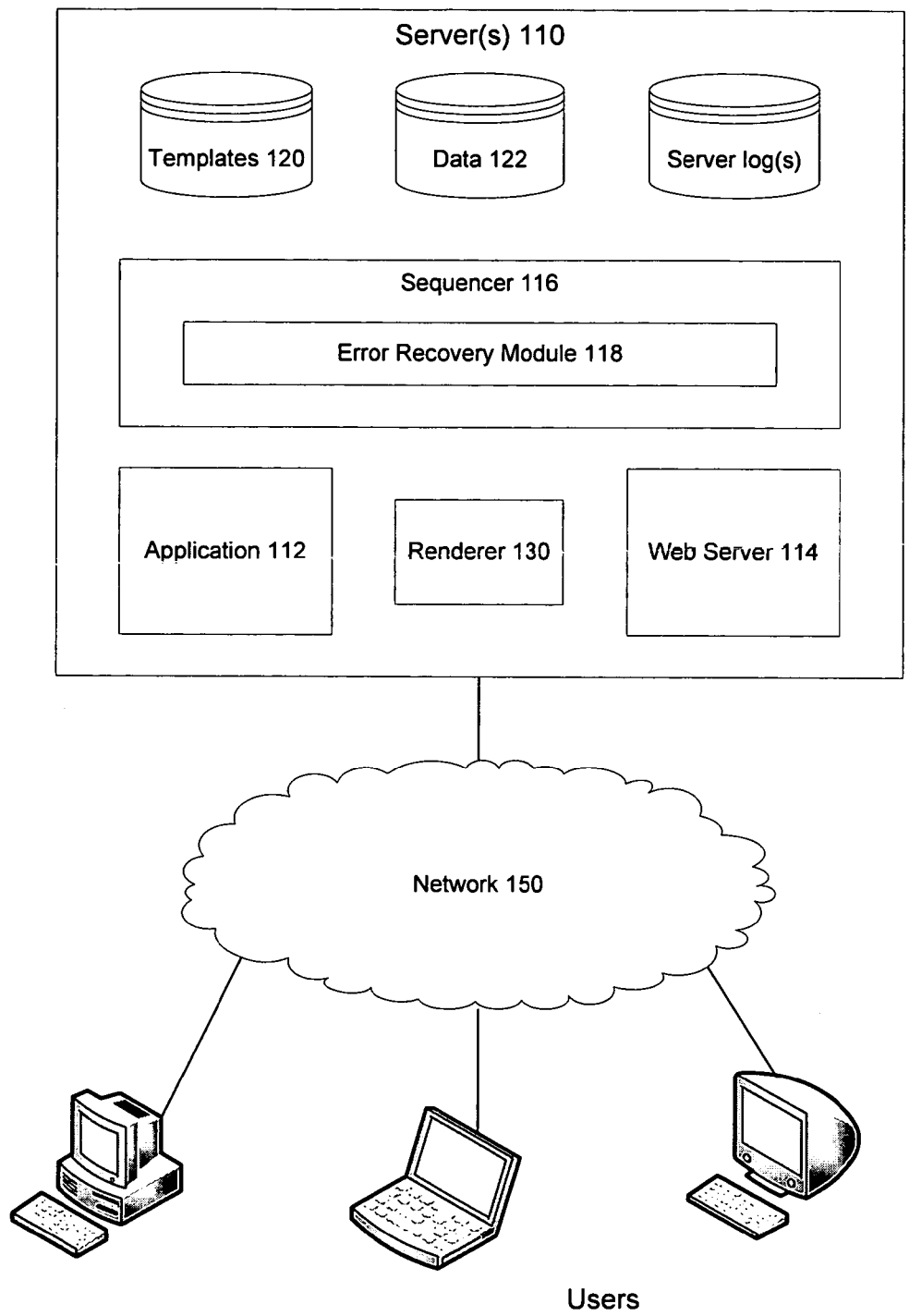
FIG. 1 is a block diagram illustrating a computing environment for facilitating recovery from a document creation failure or error in an embodiment of the invention.

FIG. 1 is a block diagram of a computing environment for facilitating recovery from a document creation evolution that failed or resulted in one or more errors, according to one embodiment of the invention. In this embodiment, documents are created on a web server, application server or other server or set of servers, within a distributed computing environment in which users operate client computing devices to communicate with the server(s). Other embodiments of the invention employing comparable computing environments may be derived from the following description without exceeding the scope of the invention.

In FIG. 1, users connect to server(s) 110 via network 150 and/or other communication links, which may be dedicated or shared, wired or wireless, metallic or optical, etc. Network 150 may comprise the Internet and/or an organization's internal LAN (Local Area Network), intranet or other network.

Server 110 may be an application server, a web server, a data server or some other kind of server computer. Thus, server 110 may provide users access to any number of application programs (such as application 112), world-wide web content (e.g., via web server 114), database contents, etc.

In particular, however, server 110 is configured to generate and/or alter documents based on forms and/or document templates (e.g., templates 120) employed by application 112, web server 114 and/or other modules. Creation of the documents may require data provided by a user, a set of data residing on server 110 (e.g., data 122), an external database, a web site and/or other data sources or providers.

Sequencer 116 is configured to create and/or alter documents on behalf of application 112, web server 114 and/or other programs or program modules, using templates 120. For example, application 112 or web server 114 may identify a template from templates 120 for use in creating a document requested by a user. The application or web server passes the template (or an identifier of the template) to the sequencer and instructions for merging the template with a set of data. After the template and data are merged, the resulting document may be served to the user by the sequencer or by the application or web server.

In the embodiment of the invention depicted in FIG. 1, error recovery module 118 of sequencer 116 is configured to gather input collateral in the event of an error during generation or rendering of a target document. The input collateral may include (but is not limited to) the template used to create the document, data that were or would have been used to create the document, a configuration file used by the sequencer to configure the document creation, the instructions used (or that would have been used) to create the document, a driver file for defining formatting rules for the resulting document (e.g., a PDF, PCL or PostScript document), log files and/or trace files written during document creation (or information written to such files), etc.

The gathered input collateral may include these actual items (e.g., the actual template, the set of data) and/or identifiers of the items (e.g., template name or number, name of data table or query used to retrieve the data). The input collateral may also identify the user who initiated the document creation process and the application that was attempting to create the target document.

In the event of an error during creation of the document, the input collateral is either merged into the target document (if it was created) or used to create a dummy or error document (if the target document was not created or no target document was to be created). In either case, the resulting document can be provided to the requestor (e.g., a user), saved on the server, forwarded to support personnel, etc.

Renderer 130 is a service module for rendering documents in a suitable format for presentation to a user, technical support personnel, help desk personnel, etc. In one embodiment of the invention, renderer 130 is specifically configured to generate a PDF (Portable Document Format) document, and may therefore comprise program code provided by Adobe Systems, Inc. Renderer 130 may be called by sequencer 116, error recovery module 118, application 112, web server 114 and/or other entities.

One skilled in the art will appreciate that some of the input collateral that would normally be reviewed by support personnel when attempting to resolve a document error may not normally be readily accessible to such personnel. In other words, traditional methods of error recovery may have required assistance from a system administrator or other person having appropriate access rights to server logs and/or other restricted information. By injecting the necessary log entries and input collateral into the target document or error document in an embodiment of the invention described herein, support personnel are better equipped to fully resolve errors.

Figure 2:
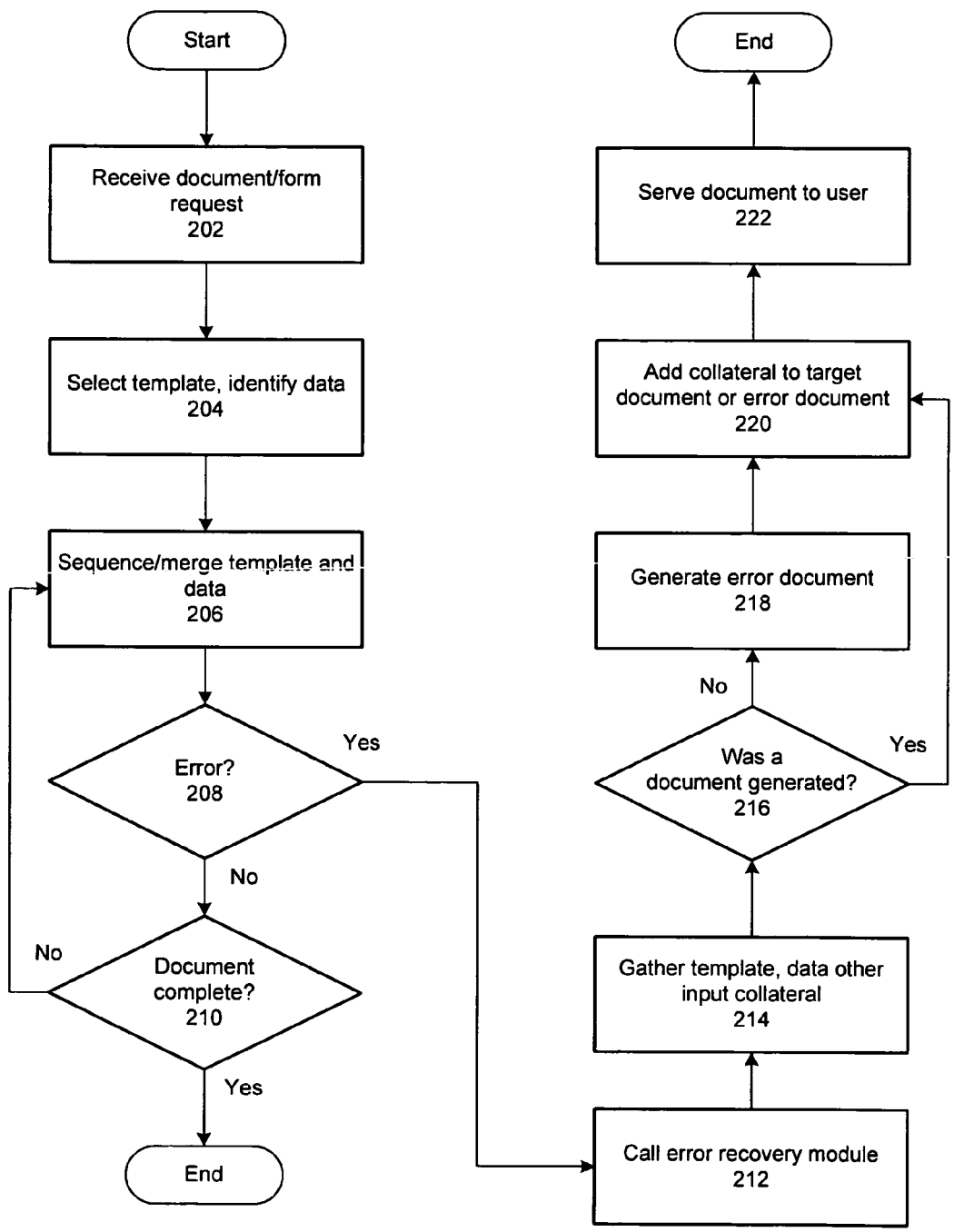
FIG. 2 is a flowchart illustrating one method of facilitating recovery from a document creation failure or error in accordance with an embodiment of the invention.

FIG. 2 illustrates a method of facilitating recovery from an error encountered during creation of a document from a template or form, according to one embodiment of the invention.

In operation 202, a user request for a document is received at an application server, a web server, a data server or other computing device configured to assemble and/or alter documents from forms/templates and serve the documents to users. For example, a user may navigate to an application server within her company and request creation or alteration of a document for changing employee benefits, updating tax withholding information, etc. In embodiments of the invention described and claimed herein, "creating" or "creation of" a document may be interpreted to encompass the generation of a new document as well as the alteration of an existing document.

Creation of a target document may involve merging a copy of a template with applicable data (e.g., existing employee benefits, current tax withholding information). When the merged document is presented to the user, she can then alter the data and the server will apply the changes to her permanent data and/or present an updated document to her. Errors may occur at virtually any point in this process.

In operation 204, the server (e.g., the application that received the user's request) identifies a template for creating the requested document, and also identifies data needed to populate the document. Thus, the server may retrieve the necessary template and initiate a query to retrieve the pertinent data. Or, the data may be provided with the user's request. In yet another embodiment, the document to be created will be blank and therefore no data needs to be retrieved before presenting the document to the user.

In operation 206, a sequencer initiates creation or alteration of the document, or attempts to initiate document creation, after appropriate instructions and any necessary input are identified by or received from the application. In particular, the application provides (or identifies) to a sequencer a set of instructions for assembling the user's document, which may indicate what data to merge with the template, how to map data fields to template fields, etc. The instructions may be accompanied by the template, data and/or any other necessary input (e.g., image files to be embedded in the document, a digital signature to be applied, an encryption method), or identifiers of the template, data and/or other input.

Illustrative types of applications with which an embodiment of the invention may be implemented include invoice generation or printing, purchase order generation or printing, sales order acknowledgements, employee self-service benefits, check printing, insurance form processing, and virtually any other application involving the generation of documents from a form or template.

In operation 208, during the document creation process the sequencer continually determines whether an error has occurred. For example, necessary data or input may not have been provided, the data may be missing some component (e.g., one or more data fields), data (e.g., one or more data fields) may be of the wrong type or have inappropriate values (e.g., a negative dollar amount), a data field may be misnamed, an input file (e.g., a logo or picture) may not be available, a date or timestamp may be incorrect or invalid, etc.

Many different types of errors could occur, of varying severity. Depending on the severity, the target document (the document requested by the user) may be created but contain an error, the target document may be complete but an error may occur during post-processing (e.g., when rendering the document into a PDF format) or the target document may not even be created.

The manner and extent to which input collateral, metadata and/or other information facilitating recovery is embedded within a document for return to the user and/or other personnel may be customizable. For example, some data may be omitted if an error occurs, all data could be included even if no error occurs, etc.

If an error is detected, the illustrated method advances to operation 212. If no error is detected, the method continues with operation 210.

In operation 210, if the document is completed without an error, the method ends. Otherwise, the sequencer continually monitors for errors and repeats operations 206-210 while applying the sequencing instructions.

In operation 212, an error has been detected and so the sequencer calls an error recovery module. Illustratively, the type and/or severity of the error may dictate how the error is handled. Thus, input collateral may be assembled and forwarded to the user (and/or stored or transmitted elsewhere) in all cases, or only in case of non-minor errors.

In operation 214, the error recovery module assembles some or all input collateral that was used or would have been used to create the target document. The module may gather the actual collateral items (e.g., the template, the data, log files) and/or identifiers of the collateral items.

In operation 216, it is determined whether a target document was created. If a target document was not created (or the user requested action that did not require creation of a target document), the method continues with operation 218. If a target document was created, the method advances to operation 220.

In operation 218, the error recovery module generates an error or dummy document (or invokes another module, such as a renderer, to create such a document) to contain and convey the collateral. Whether or not the error document is used to transmit the input collateral to the user (or other personnel), the error document may be stored on the server and given a name that may indicate a date/time of the error, the application, the user, etc.

In operation 220, the error recovery module stores the collateral items (or identifiers of the collateral items) in, or attaches them to, the target document (if it was created). If no target document was created, the collateral is added or attached to the error document.

In operation 222, the target document or error document is forwarded to the user. The document may also be forwarded to support staff or other personnel (e.g., a help desk, a developer, technical support) by the server or by the user. Such personnel may use the collateral to recreate the error, trace the error, debug the application or take other action to recover from the document creation error or failure.

An implementation of the embodiment of the invention depicted in FIG. 2 promotes the collection of information for error recovery immediately at the time an error occurs, rather than waiting until the error is detected by a user. Because that information is collected immediately, personnel involved in the error recovery process can review or recreate the same conditions that existed at the time of the error. There is little or no danger that some data or operating parameters may have changed between the time of the error and the time support personnel investigate the error and review the operating conditions and environment.

Also, because all relevant information is assembled for easy access by the user and/or support personnel, those personnel need not wade through a plethora of unrelated information (e.g., impertinent server log entries).

In one embodiment of the invention, an error may not be detected in a document created from a form until after a user inputs new or additional data. Errors detected at this time may generate the same response as discussed above. As a result, information for facilitating recovery from an error may be assembled and injected into a target document or error document regardless of whether the error occurs during initial creation of the target document for presentation to (and completion by) the user, or after the user inputs her data.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk, DVD) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A method comprising:
    performing by one or more computing devices:
        receiving input providing data in a document creation environment;
        receiving a request to create a document by merging a template and the data;
        detecting an error when attempting to merge the data and a template to create the document;
        in response to detecting the error:
            assembling collateral items identifying operating conditions in the document creation environment when the error occurred, the collateral items comprising log documents generated during the attempt to create the document, the template, the data, a configuration file used to configure the document, a driver file defining formatting rules for the document, and instructions for creating the document; and
            providing the collateral items in a single document for error recovery.

2. The method of claim 1 wherein providing the collateral items in the single document comprises attaching the collateral items to the document.

3. The method of claim 1 wherein providing the collateral items in the single document comprises embedding the collateral items in the document.

4. The method of claim 1 wherein providing the collateral items in a single document is customizable.

5. The method of claim 1 wherein the single document is provided encrypted.

6. The method of claim 1 wherein application of a digital signature is provided in the single document.

7. A system, comprising:
   at least one processor, and
   a memory storing program instructions, wherein execution of the program instructions by the at least one processor causes the at least one processor to perform operations comprising:
   receiving input providing data in a document creation environment;
   receiving a request to create a document by merging a template and the data;
   detecting an error when attempting to merge the data and a template to create the document;
   in response to detecting the error:
      assembling collateral items identifying operating conditions in the document creation environment when the error occurred, the collateral items comprising log documents generated during the attempt to create the document, the template, the data, a configuration file used to configure the document, a driver file defining formatting rules for the document, and instructions for creating the document; and
      providing the collateral items in a single document for error recovery.

8. A non-transitory computer-readable storage medium storing program instructions that when executed by a computer implement:
   receiving input providing data in a document creation environment;
   receiving a request to create a document by merging a template and the data;
   detecting an error when attempting to merge the data and a template to create the document;
   in response to detecting the error:
      assembling collateral items identifying operating conditions in the document creation environment when the error occurred, the collateral items comprising log documents generated during the attempt to create the document, the template, the data, a configuration file used to configure the document, a driver file defining formatting rules for the document, and instructions for creating the document; and
      providing the collateral items in a single document for error recovery.

9. The method of claim 1 wherein the single document is used for error recovery by using the collateral items to recreate the error and fully resolve the error.

10. The method of claim 1 wherein the single document is used for error recovery by using the collateral items to trace the error.

11. The method of claim 1 wherein the single document is forwarded to support personnel.

* * * * *